United States Patent
Fajri et al.

(10) Patent No.: US 12,219,383 B2
(45) Date of Patent: Feb. 4, 2025

(54) QUALITY OF EXPERIENCE REPORTING OVER NON-ACCESS STRATUM (NAS) SIGNALING

(71) Applicant: Cisco Technology, Inc., San Jose, CA (US)

(72) Inventors: Anthony Fajri, Pleasanton, CA (US); Gautam Mohanlal Borkar, Redmond, WA (US); Solomon Ayyankulankara Kunjan, Milton (CA); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 17/851,331

(22) Filed: Jun. 28, 2022

(65) Prior Publication Data

US 2023/0422081 A1    Dec. 28, 2023

(51) Int. Cl.
| | |
|---|---|
| *H04W 28/02* | (2009.01) |
| *H04W 8/06* | (2009.01) |
| *H04W 28/24* | (2009.01) |
| *H04W 36/00* | (2009.01) |

(52) U.S. Cl.
CPC ......... *H04W 28/0268* (2013.01); *H04W 8/06* (2013.01); *H04W 28/24* (2013.01); *H04W 36/0033* (2013.01)

(58) Field of Classification Search
CPC ... H04W 28/0268; H04W 8/06; H04W 28/24; H04W 36/0033
See application file for complete search history.

(56) References Cited

U.S. PATENT DOCUMENTS

| | | |
|---|---|---|
| 2020/0112907 A1 | 4/2020 | Dao et al. |
| 2020/0153712 A1 | 5/2020 | Miao et al. |
| 2020/0280871 A1 | 9/2020 | Khirallah et al. |

FOREIGN PATENT DOCUMENTS

| | | |
|---|---|---|
| WO | 2021098074 | 5/2021 |
| WO | 2021213481 | 10/2021 |
| WO | 2022005361 A1 | 1/2022 |
| WO | 2022005379 | 1/2022 |

OTHER PUBLICATIONS

International Search Report and Written Opinion for International Application No. PCT/US2023/068579, mailed Oct. 9, 2023, 12 Pages.

(Continued)

*Primary Examiner* — Ashley Shivers
(74) *Attorney, Agent, or Firm* — Polsinelli P.C.

(57) ABSTRACT

Disclosed herein are systems, methods, and computer-readable media for reporting QoE of a UE, as measured and determined from the perspective of the UE to one or more core components of the cellular network to which the UE is attached. The QoE may then be used by the one or more core components for managing and adjusting, if necessary, the cellular services provided to the UE. In one aspect, a method includes determining, at a user device, a quality of experience (QoE) of user device connected to a cellular network and transmitting, via a non-access stratum (NAS) signaling, a value of the QoE from the user device to a core network element of the cellular network, wherein the core network element utilizes the QoE value to manage network access and a quality of service (QoS) of the user device.

20 Claims, 12 Drawing Sheets

(56) References Cited

OTHER PUBLICATIONS

OPPO: "Solution Update on ATSSS Execution Procedure in TFCP Solution", 3GPP Draft, S2-187851 ATSSS_update on ATSSS Execution Procedure in TFCP Solution, 3GPP, Mobile Competence Centre, 650, Route Des Lucioles, F-06921 Sophia-Antipolis, vol. SA WG2, No. Sophia Antipolis, France, Aug. 20, 2018-Aug. 24, 2018, Aug. 14, 2018, XP051536810, Section 2.

QUALITY OF EXPERIENCE REPORTING OVER NON-ACCESS STRATUM (NAS) SIGNALING

TECHNICAL FIELD

The subject matter of this disclosure relates in general to the field of computer networking, and more particularly, to reporting Quality of Experience (QoE) of user equipment (UE), as measured from the perspective of the UE, over non-access stratum (NAS) signaling to core components of a cellular network to which the UE is attached.

BACKGROUND

Compared to previous cellular network generations, 5G extends the catalog of applicable spectrum frequency bands and offers access to a broad range of spectrum resources. As such, in 5G deployments, efficient use of all spectrum bands and resources is key to delivering a broad range of 5G services with optimal QoS (Quality of Service) and QoE (Quality of Experience). QoE in a cellular network measures the satisfaction factor of a UE within the cellular services. In particular, QoE can be measured by latency, throughput, packet loss, or other metrics, for example, via a speed test.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
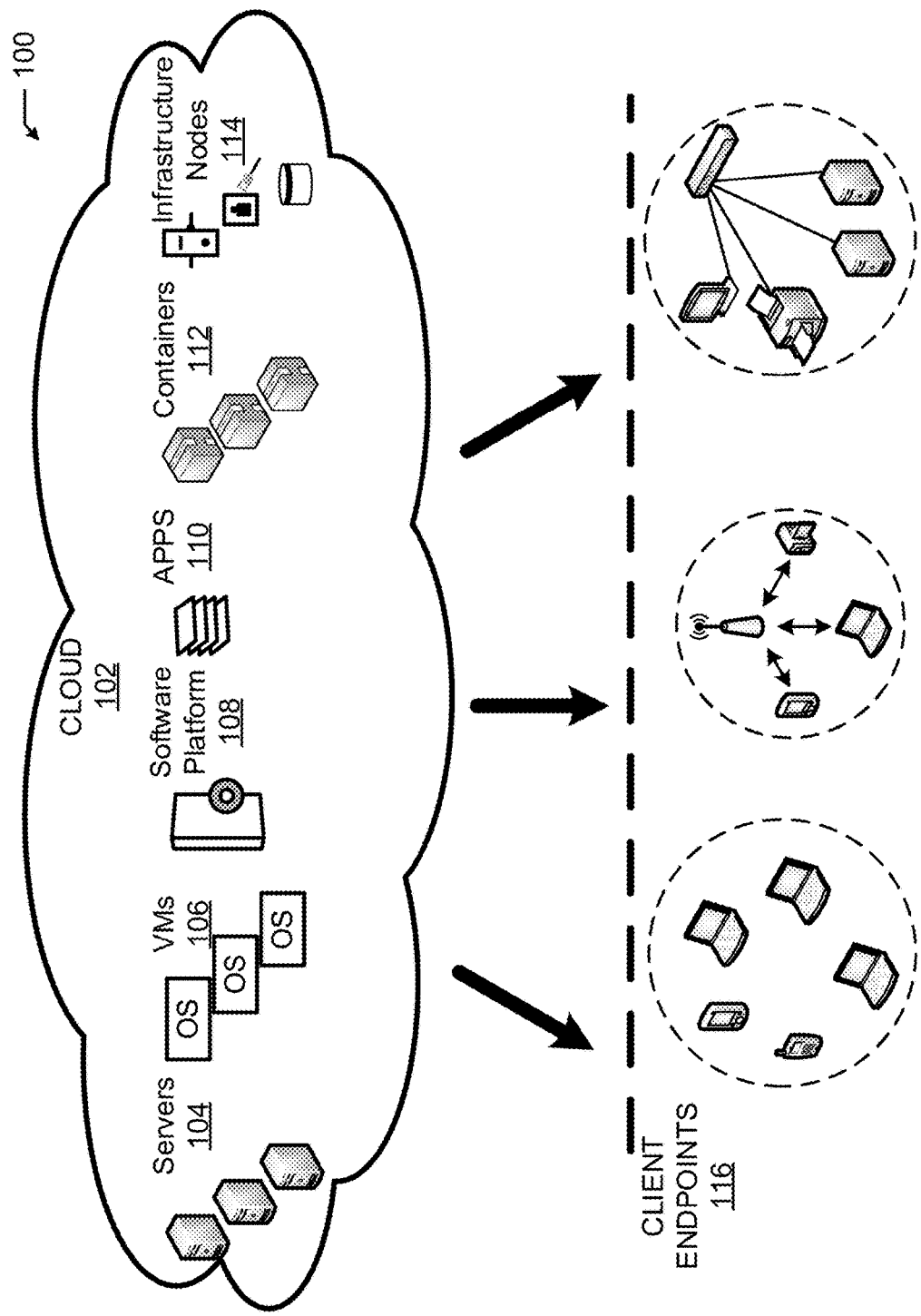
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable media for reporting QoE of a UE, as measured and determined from the perspective of the UE, over NAS signaling to one or more core components of the cellular network to which the UE is attached. The QoE may then be used by the one or more core components for managing and adjusting, if necessary, the cellular services provided to the UE.

In one aspect, a method includes determining, at a user device, a quality of experience (QoE) of user device connected to a cellular network and transmitting, via a non-access stratum (NAS) signaling, a value of the QoE from the user device to a core network element of the cellular network, wherein the core network element utilizes the QoE value to manage network access and a quality of service (QoS) of the user device.

In another aspect, the method further includes storing the value of the QoE at the user device to be transmitted to the core network element within an update message sent from the user device to the core network element.

In another aspect, wherein the value of the QoE is transmitted in real-time or periodically.

In another aspect, the core network element is a Mobility Management Entity (MME) of the cellular network when the cellular network is a 4G network.

In another aspect, the MME forwards, via a modify bearer request, the value of the QoE to (1) a serving gateway (SGW) and a packet data network gateway (PGW) of the cellular network or (2) an Application Function (AF) of the cellular network for managing the network access of the user device.

In another aspect, the core network element is an element implementing an Access and Mobility Management Function (AMF) when the cellular network is a 5G network.

In another aspect, the AMF forwards, via a session management context update, the value of the QoE to a Session Management Function (SMF) of the cellular network for managing the network access of the user device.

In one aspect, a device includes one or more memories having computer-readable instructions stored therein and one or more processors. The one or more processors are configured to execute the computer-readable instructions to determine, at the device, a quality of experience (QoE) of device connected to a cellular network and transmit, via a non-access stratum (NAS) signaling, a value of the QoE from the device to a core network element of the cellular network, wherein the core network element utilizes the QoE value to manage network access and a quality of service (QoS) of the device.

In one aspect, one or more non-transitory computer-readable media include computer-readable instructions, which when executed by one or more processors at a user device, causes the user device to determine, at the device, a quality of experience (QoE) of device connected to a cellular network and transmit, via a non-access stratum (NAS) signaling, a value of the QoE from the device to a core network element of the cellular network, wherein the core network element utilizes the QoE value to manage network access and a quality of service (QoS) of the device.

Description of Example Embodiments

The following acronyms are used throughout the present disclosure, provided below for convenience.
AAA: Authentication Authorization Accounting
AF: Application Function
AMF: Access and Mobility Management Function
CGW: Converged Gateway
CHF: Charging Function
MBR: Modify Bearer Request
MME: Mobility Management Entity
NAS: Non-Access Stratum
OCS: Online charging system
PCF: Policy Control Function
PCRF: Policy and Charging Rules Function
PGW: Packet Data Network (PDN) Gateway
SCEF: Service Capability Exposure Function
SGW: Serving Gateway
SMF: Session Management Function
SPGW: Serving/PDN Gateway
TAU: Tracking Area Update
UPF: User Plane Function As noted above, QoE refers to a measurement of the network service delivery as experienced by an end-user. QoS refers to the network parameter settings configured by service providers to deliver various service level offerings to their end-users (i.e., network performance metrics). As QoE and QoS provide a way to measure and evaluate network performance, it is critical to have such information not only at an overall network scale but also at a granular scale. However, an existing approach does not provide a mechanism for a network to know the QoE of a particular UE due to a lack of channel for UE to report the QoE to the network. As follows, the capability of the network to serve the particular UE based on the QoE can be limited.

Therefore, there exists a need for an enhanced QoE reporting system that supports reporting of QoE to the network. The present technology includes systems, methods, and computer-readable media for solving the foregoing problems and discrepancies, among others. In some examples, systems, methods, and computer-readable media are provided for reporting QoE to a network over NAS signaling per UE.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
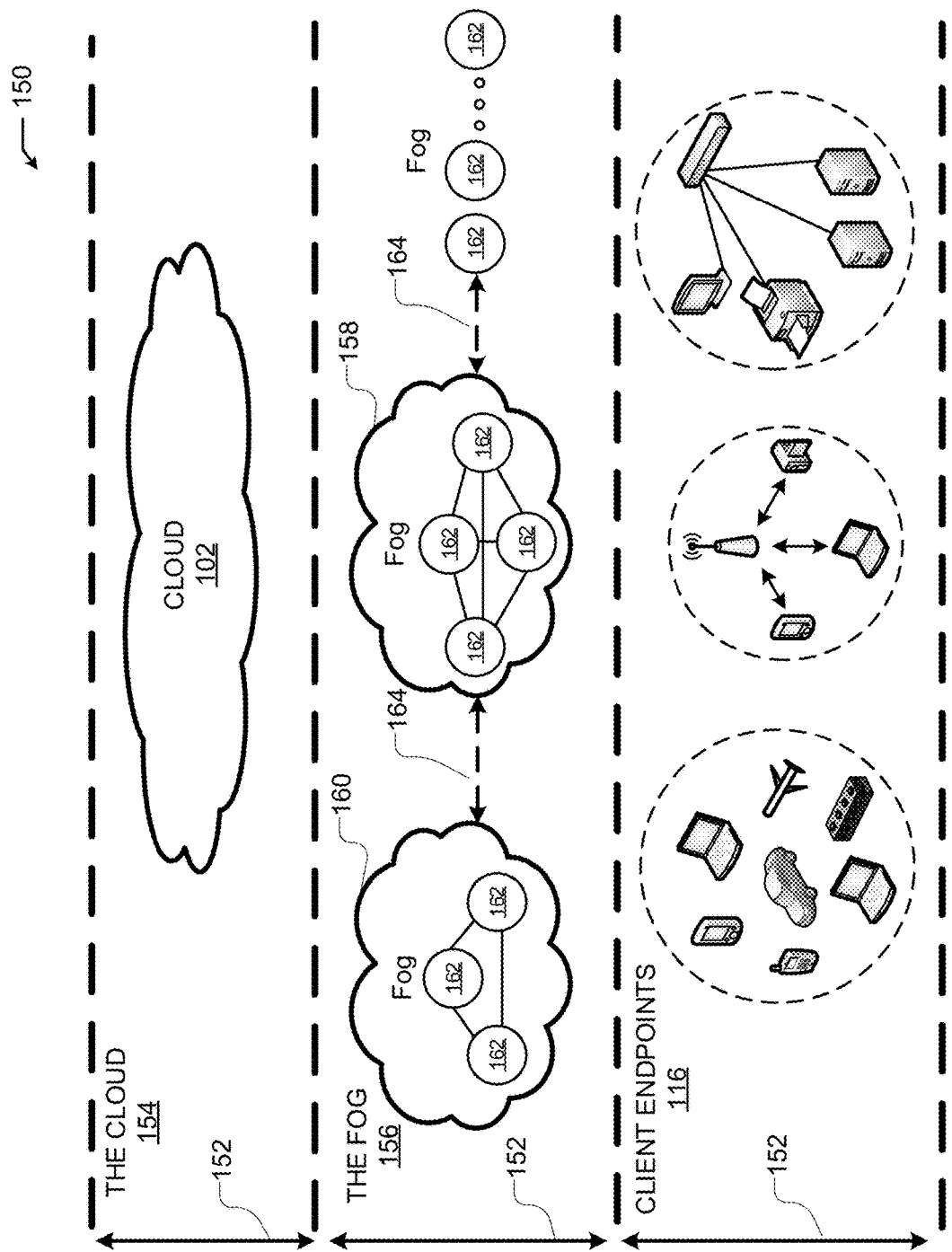
FIG. 1B illustrates an example fog computing architecture

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
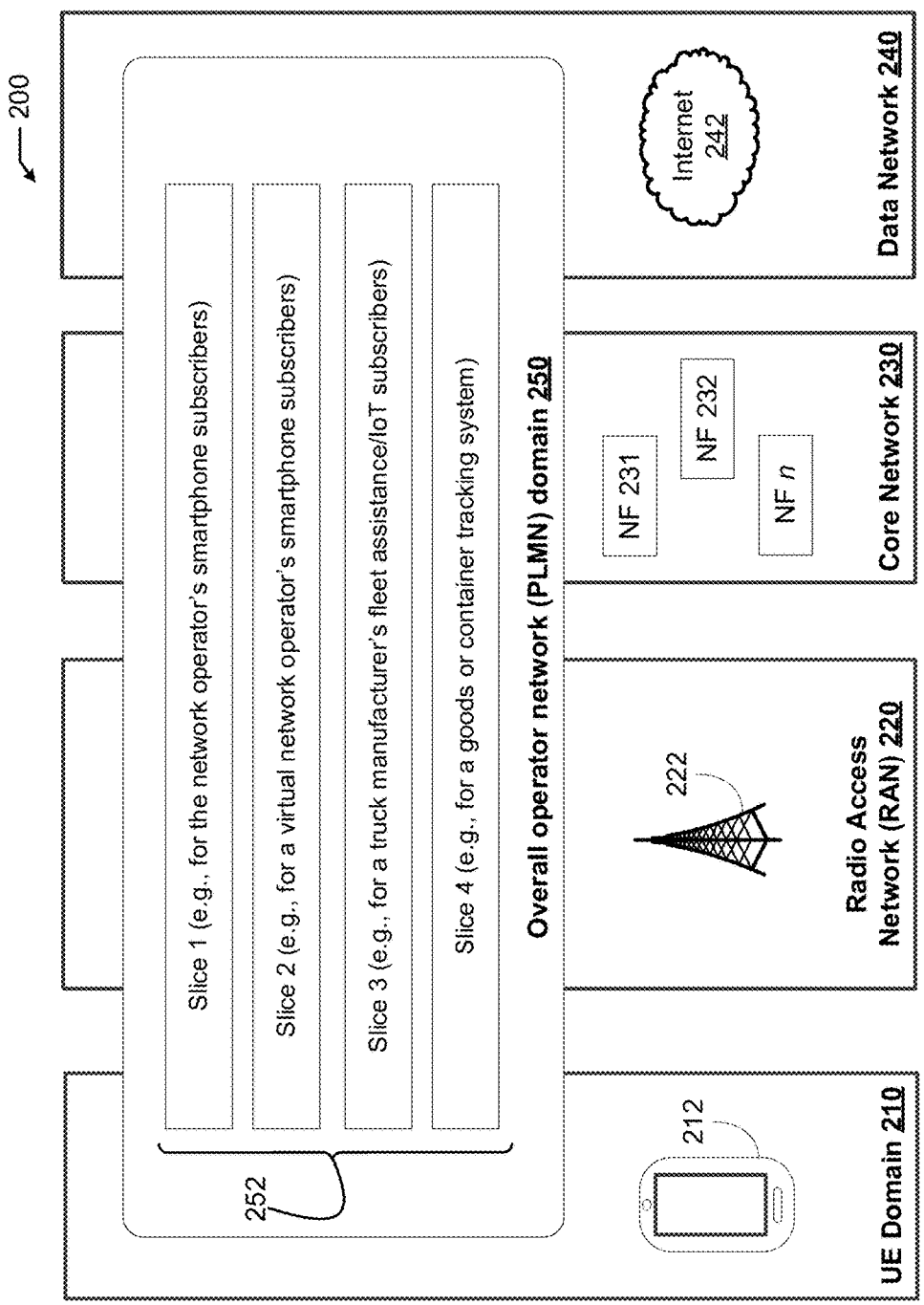
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer need.

Figure 3:
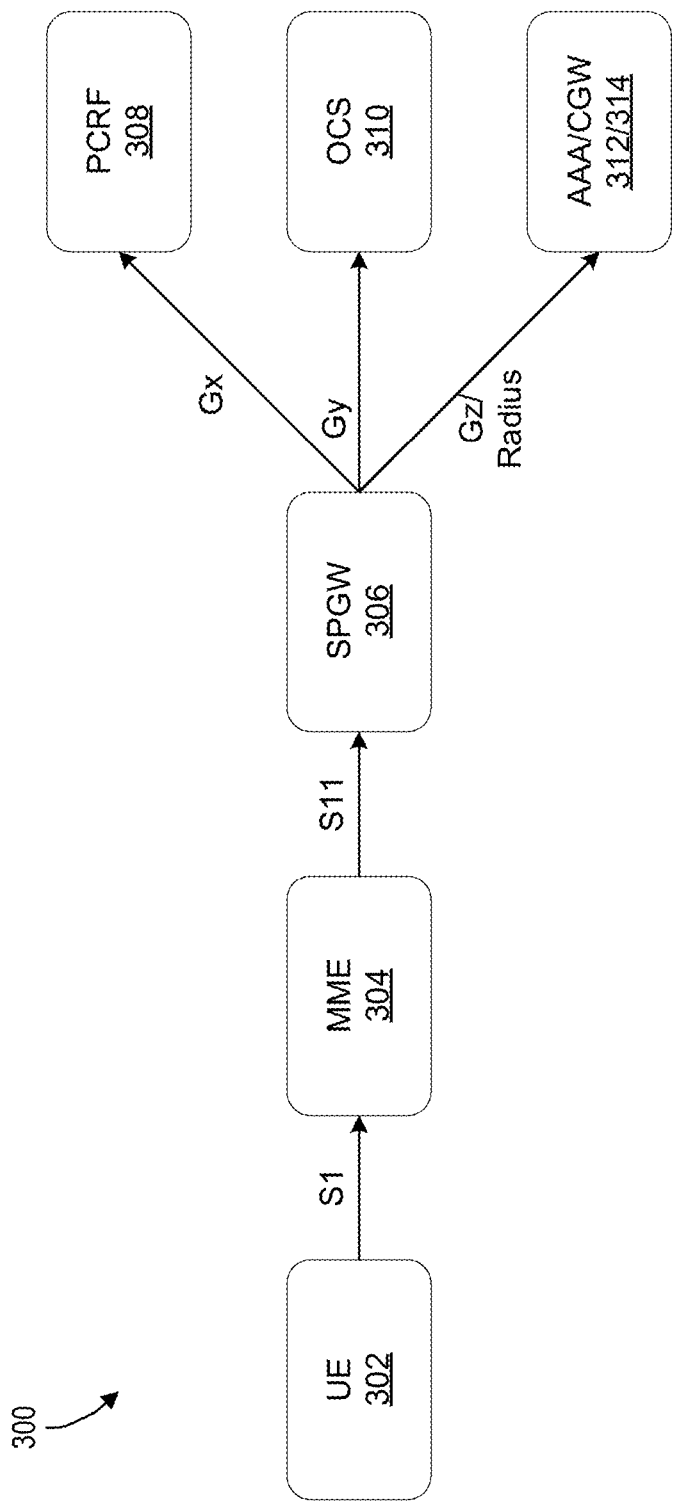
FIG. 3 illustrates an example LTE network environment for an enhanced QoE reporting system, according to some aspects of the present disclosure.

FIG. 3 illustrates an example enhanced QoE reporting system 300 in an LTE network environment, according to some aspects of the present disclosure. More specifically, enhanced QoE reporting system 300 facilitates QoE reporting in an LTE network environment via SPGW. Enhanced QoE reporting system 300 comprises UE 302, MME 304, SPGW 306, PCRF 308, OCS 310, AAA 312, and CGW 314.

According to some examples, UE 302 can have an agent that can measure QoE. The agent, which runs on UE 302 can periodically take a QoE measurement (e.g., every 30 minutes). In some instances, a schedule for a QoE measurement can be predefined. Also, the agent can calculate or collect data relating to throughput, latency, and packet loss. UE 302 can receive a value of the QoE measurement from the agent internally.

In some aspects, UE 302 can report the QoE value to MME 304 during an existing periodic TAU procedure as an optional attribute (i.e., NAS signaling), for example, over an Si interface. In some examples, enhanced QoE reporting system 300 can use the periodic Tracking Area Update (TAU) procedure to report QoE to a network. The signaling load for NAS signaling can be the same as the currently available TAU procedure. In some aspects, an existing periodic TAU timer (e.g., T3412) can be used as a timer to report the QoE to the network. In other aspects, a new signaling procedure can be used, which can introduce a new timer and new signaling message. In some examples, the proposed disclosure covers both an "out-of-band" path (e.g., from and an "in-band" path (e.g., via gateways).

In some instances, MME 304 can process the optional attribute (i.e., QoE Value). MME 304 can also store the QoE value on the MME-UE database. Further, MME 304 can report the QoE value to SPGW 306 under two approaches. In real-time, MME 304 can send a Modify Bearer Request (MBR) to SPGW 306 upon receipt of the QoE value. In non-real-time, MME 304 can wait for MBR based on the existing trigger to report the QoE value to SPGW 306.

According to some implementations, SPGW 306 can be configured to report the QoE value to PCRF 308, OCS 310, AAA 312, and CGW 314. More specifically, SPGW 306 can report the QoE value to PCRF 308 over a Gx interface (e.g., Credit-Control-Request (CCR) Gx Message). SPGW 306 can report the QoE value to OCS 310 over a G y interface (e.g., CCR Gy Message). Further, SPGW 306 can report the QoE value to AAA 312 and CGW 314 over GPRS Tunneling Protocol Prime (GTPP) and Radius-based interface. Upon receipt of the QoE value, each of PCRF 308, OCS 310, AAA 312, and CGW 314 can process the optional attribute (i.e., QoE value) and implement a use case based on the QoE value.

Figure 4:
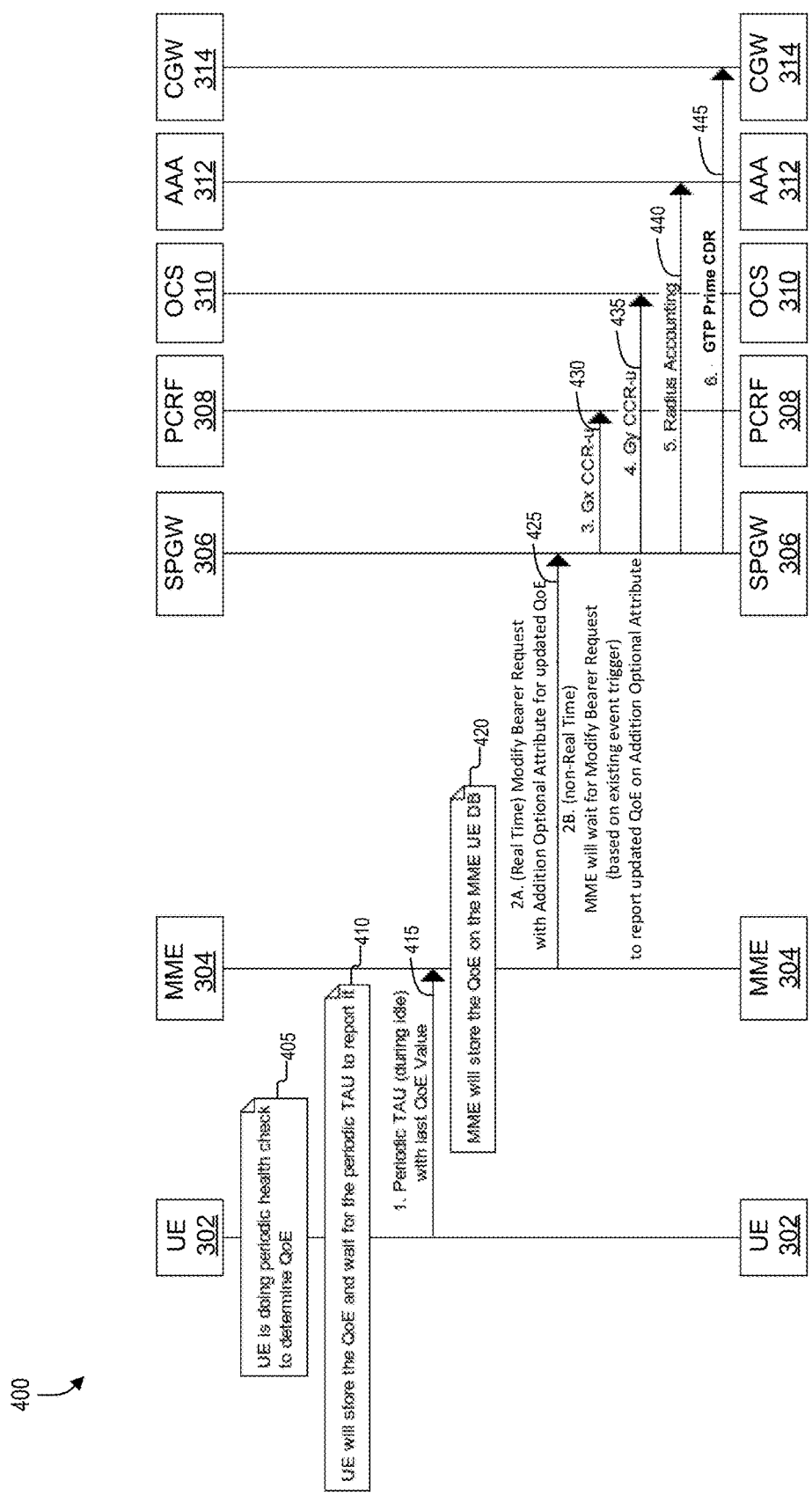
FIG. 4 illustrates an example communication diagram for reporting QoE in the enhanced QoE reporting system as depicted in FIG. 3, according to some aspects of the present disclosure.

FIG. 4 illustrates an example communication diagram 400 for reporting QoE of the enhanced QoE reporting system 300 as depicted in FIG. 3, according to some aspects of the present disclosure. As shown in FIG. 3, enhanced QoE reporting system 300 comprises UE 302, MME 304, SPGW 406, PCRF 408, OCS 410, AAA 412, and CGW 414.

According to some examples, UE 302 performs a periodic check for network performance (i.e., network health) to determine QoE at step 405. Once UE 302 determines a QoE value, UE 302 can store the QoE value and wait for a periodic TAU to report it at step 410.

At step 415, UE 302 can report the QoE value to MME 304 over NAS signaling (e.g., as an optional attribute within a periodic TAU procedure (during idle)). Upon receipt, MME 304 can store the QoE value on an MME-UE database at step 420.

In real-time, MME 304 can report the QoE value immediately after it receives the QoE value from UE 302. More specifically, MME 304 can send an MBR message with an additional optional attribute for the QoE value to SPGW 306 at step 425. As follows, a network service provider can implement a real-time use case. However, it can increase a transaction per second (TPS) on S11 messages.

On the other hand, in non-real-time, MME 304 can wait for an MBR message based on an event trigger to report the QoE value on an additional optional attribute at step 425. An event trigger may be any known or to be developed trigger for reporting QoE (e.g., a given periodicity, etc.). The event trigger may be a configurable parameter determined based on experiments and/or empirical studies. While a TPS on S11 messages can remain the same, a network service provider cannot implement a real-time use case under the non-real-time approach.

At step 430, SPGW 306 can report the QoE value to PCRF 308 over a Gx CCR-u interface. At step 435, SPGW 306 can report the QoE value to OCS 310 over a Gy CCR-u interface. At step 440, SPGW 306 can report the QoE value to AAA 312 over Radius Accounting. Also, at step 445, SPGW 306 can report the QoE value to CGW 314 over GTP Prime CDR.

Figure 5:
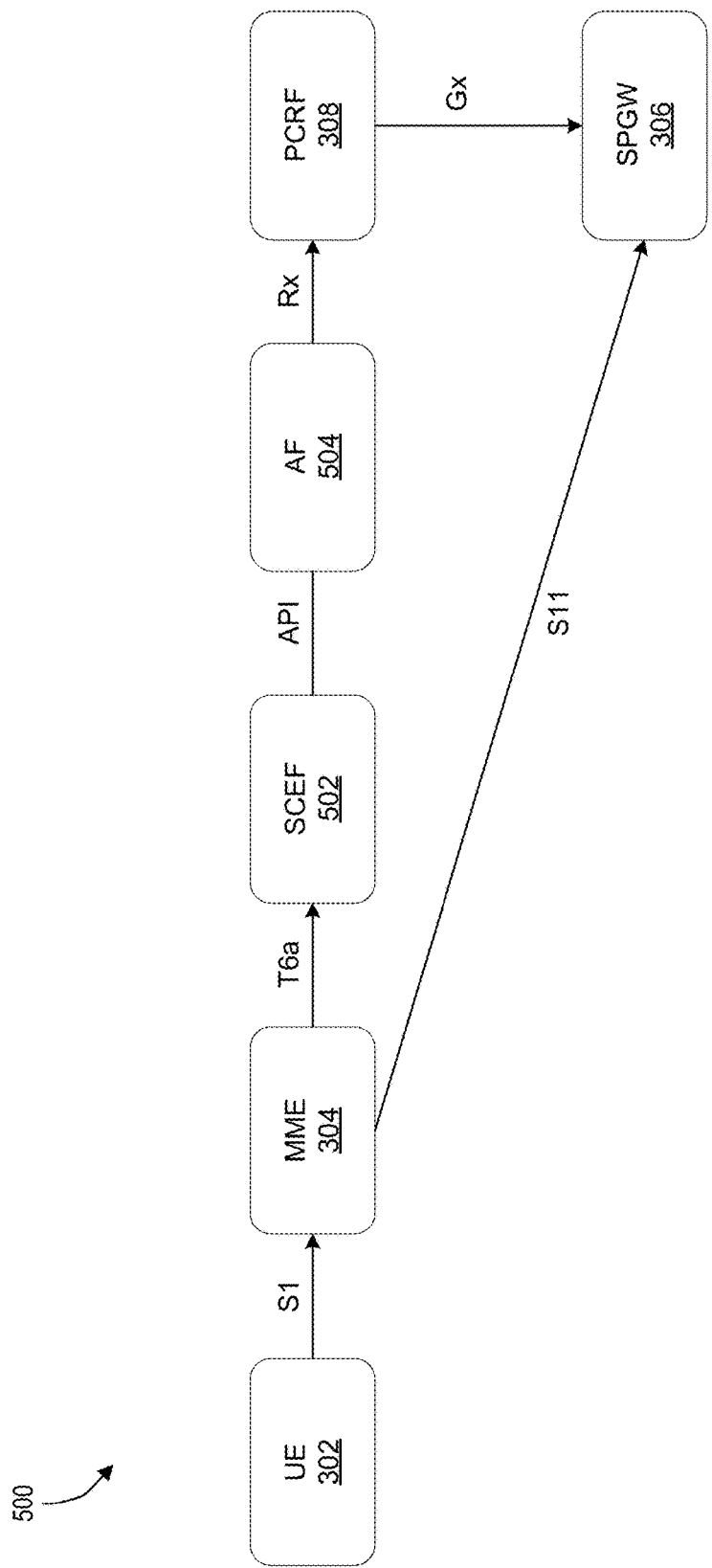
FIG. 5 illustrates another example LTE network environment for an enhanced QoE reporting system, according to some aspects of the present disclosure.

FIG. 5 illustrates another example enhanced QoE reporting system 500 in an LTE network environment, according to some aspects of the present disclosure. More specifically, enhanced QoE reporting system 500 facilitates QoE reporting in an LTE network environment via AF. Enhanced QoE reporting system 500 comprises UE 302, MME 304, SPGW 306, PCRF 308, SCEF 502, and AF 504.

As previously described, UE 302 can have an agent that can measure QoE. The agent can periodically take a QoE measurement. The measurement schedule can be predefined. Also, the agent can calculate or collect data relating to throughput, latency, and packet loss. UE 302 can receive a value of the QoE measurement from the agent internally. In some aspects, UE 302 can report the QoE value to MME 304 during an existing periodic TAU procedure as an optional attribute (i.e., NAS signaling), for example, over an Si interface.

According to some examples, MME 304 processes the optional attribute (i.e., QoE Value). MME 304 can also store the QoE value on the MME-UE database. In some examples, MME 304 is configured to report the QoE value to SCEF 402 over the T6a interface (i.e., T6a diameter message).

In some instances, SCEF 402 can process the QoE value and report the same to AF 404 over an Application Programming Interface (API). For example, an HTTP API message from SCEF 402 can include the QoE value as an optional attribute.

Further, AF 404 processes the QoE value and reports the same to PCRF 308 over the Rx interface. PCRF 308 can process the QoE value and implement a use case based on the QoE value. An example use case of PCRF 308 includes pushing a QoS update to SPGW 306 over the Gx interface based on the existing mechanism.

In some examples, MME 304 can report the QoE value to SPGW 306 over an S11 interface as described with respect to FIG. 3.

Figure 6:
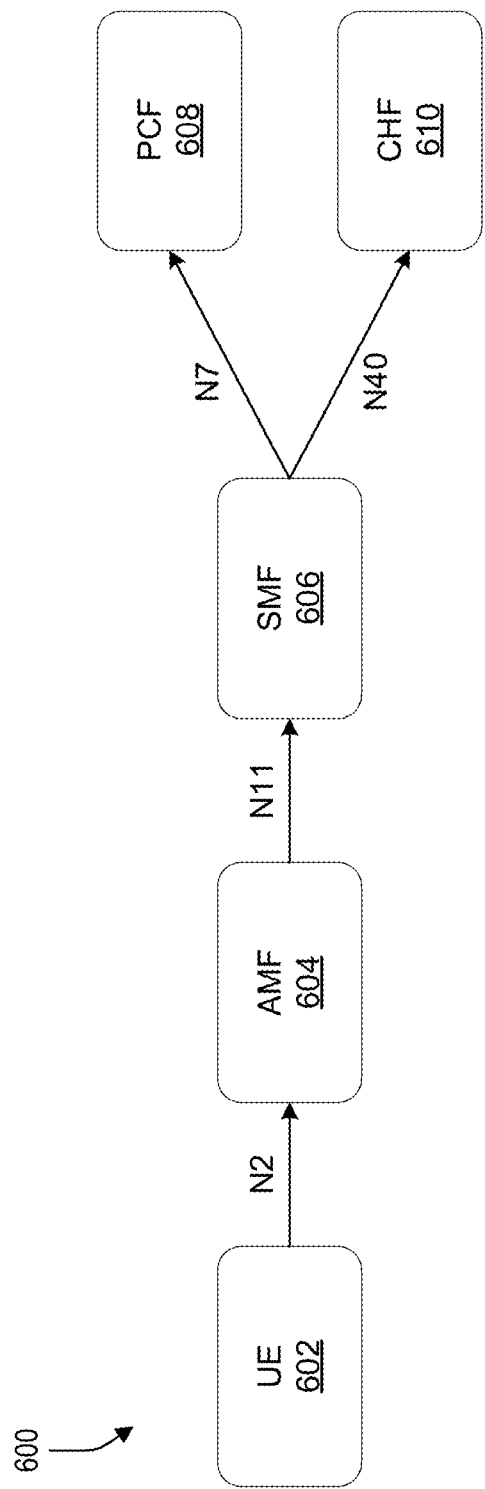
FIG. 6 illustrates an example 5G network environment for an enhanced QoE reporting system, according to some aspects of the present disclosure.

FIG. 6 illustrates an example enhanced QoE reporting system 600 in a 5G network environment, according to some aspects of the present disclosure. More specifically, enhanced QoE reporting system 600 facilitates QoE reporting in a 5G network environment via SMF. Enhanced QoE reporting system 600 comprises UE 602, AMF 604, SMF 606, PCF 608, and CHF 610.

According to some examples, UE 602 can have an agent that can measure QoE. The agent can periodically take a QoE measurement. The measurement schedule can be predefined. Also, the agent can calculate or collect data relating to throughput, latency, and packet loss. UE 602 can receive a value of the QoE measurement from the agent internally.

In some aspects, UE 602 can report the QoE value to AMF 604 during a periodic registration update as an optional attribute (i.e., NAS signaling), for example, over an N2 interface.

In some examples, AMF 604 can process the optional attribute. Further, AMF 604 can store the QoE value on an AMF-UE database. In real-time, AMF 604 can send an SM context update to SMF 606 over an N11 interface upon receipt of the QoE value. In non-real-time, AMF 604 can report the QoE value to SMF 606 based on an existing trigger over an N11 interface.

According to some examples, SMF 606 can report the QoE value to PCF 608 over an N7 interface. Further, SMF 606 can report the QoE value to CHF 610 over an N40 interface. Both PCF 608 and CHF 610 can process the optional attribute and implement a use case based on the QoE value.

Figure 7:
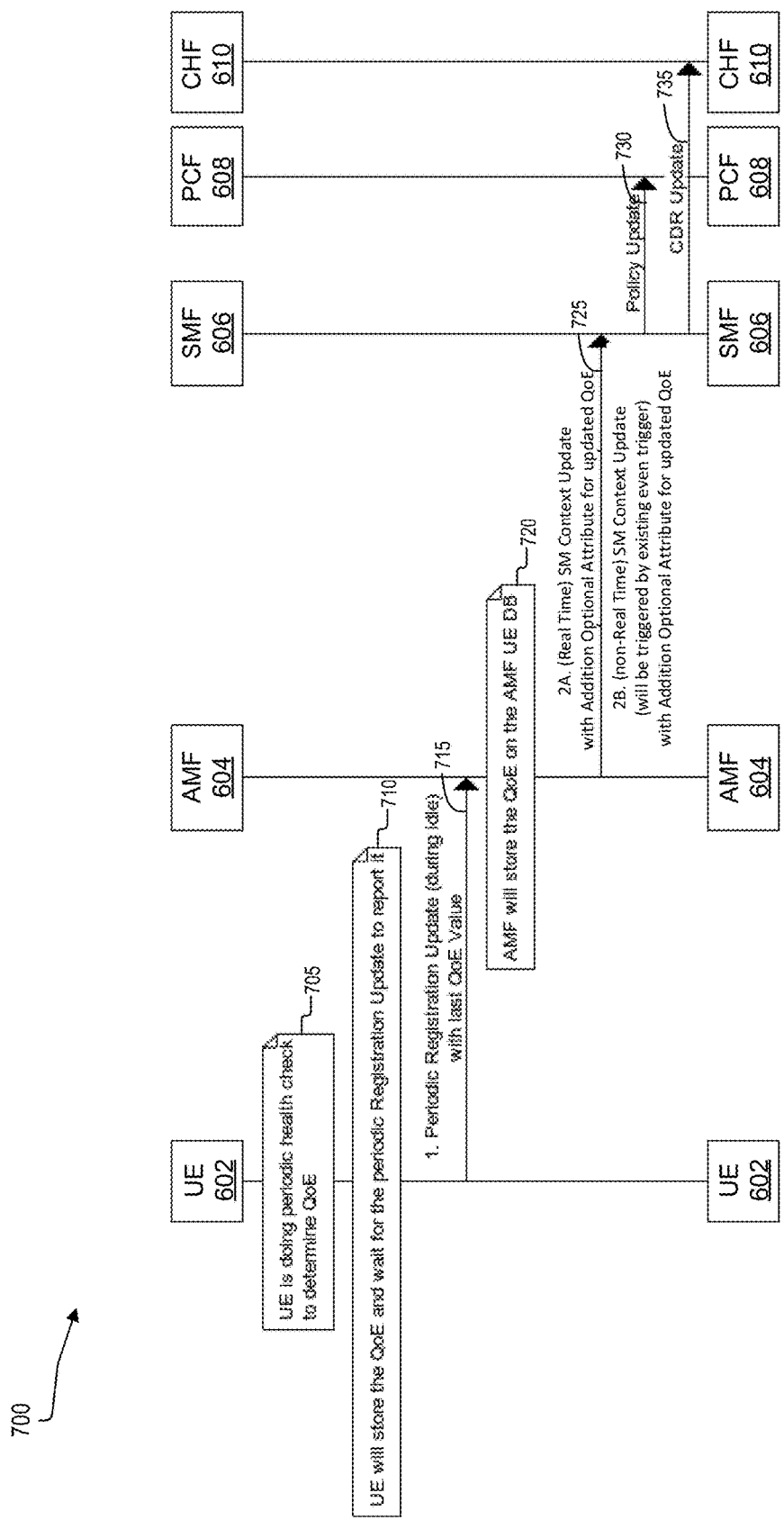
FIG. 7 illustrates an example communication diagram for reporting QoE in the enhanced QoE reporting system as depicted in FIG. 6, according to some aspects of the present disclosure.

FIG. 7 illustrates an example communication diagram 700 for reporting QoE in the enhanced QoE reporting system 600 as depicted in FIG. 6, according to some aspects of the present disclosure. As shown in FIG. 6, enhanced QoE reporting system 600 comprises UE 602, AMF 604, SMF 606, PCF 608, and CHF 610.

According to some examples, UE 602 performs a periodic check for network performance (i.e., network health) to determine QoE at step 705. Once UE 602 determines a QoE value, at step 710, UE 620 can store the QoE value and wait for a periodic Registration Update to report the QoE value.

At step 715, UE 602 can report the QoE value to AMF 604 over NAS signaling (e.g., as an optional attribute within a periodic TAU procedure (during idle)). Upon receipt, AMF 604 can store the QoE value on an AMF-UE database at step 720.

In real-time, AMF 604 can report the QoE value immediately after it receives the QoE value from UE 602. More specifically, AMF 604 can send an SM context update message with an additional optional attribute for the QoE value to SMF 606 at step 725. As follows, a network service provider can implement a real-time use case. However, it can increase a transaction per second 9TPS) on N11 messages.

On the other hand, in non-real-time, AMF 604 can wait for an SM context update, which can be triggered by an existing event trigger, at step 725, to report the QoE value. While a TPS on N11 messages can remain the same, a network service provider cannot implement a real-time use case under the non-real-time approach.

At step 730, SMF 606 can use the Update operation to report the QoE value to PCF 608 (e.g., via policy update notification). Further, at step 735, SMF 506 can use the Update operation to report the QoE value to CHF 610 (e.g., via Call Detail Record (CDR) update notification).

Figure 8:
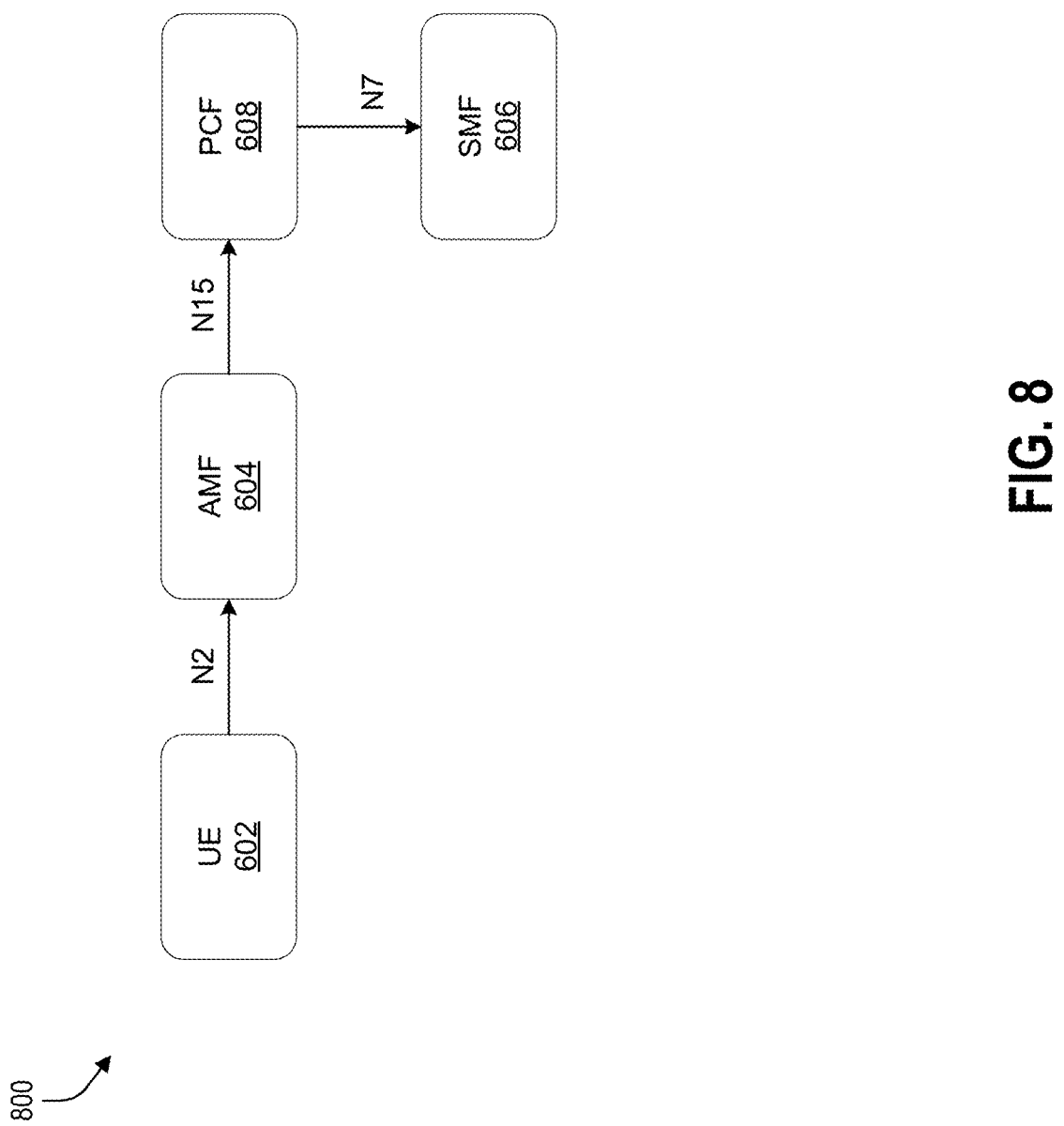
FIG. 8 illustrates another example 5G network environment for an enhanced QoE reporting system, according to some aspects of the present disclosure.

FIG. 8 illustrates another example enhanced QoE reporting system 800 in a 5G network environment, according to some aspects of the present disclosure. More specifically, enhanced QoE reporting system 800 facilitates QoE reporting in a 5G network environment directly from AMF to PCF. Enhanced QoE reporting system 800 comprises UE 602, AMF 604, SMF 606, and PCF 608.

As previously described, UE 602 can have an agent that can measure QoE. The agent can periodically take a QoE measurement. The measurement schedule can be predefined. Also, the agent can calculate or collect data relating to throughput, latency, and packet loss. UE 602 can receive a value of the QoE measurement from the agent internally. In some aspects, UE 602 can report the QoE value to AMF 604 during a periodic registration update as an optional attribute (i.e., NAS signaling), for example, over an N2 interface.

In some examples, AMF 604 can process the optional attribute. Further, AMF 604 can store the QoE value on an AMF-UE database. In some instances, AMF 604 can report the QoE value to PCF 608 via an N15 interface (e.g., N15 Policy Update).

In some instances, PCF 608 can process the optional attribute and implement a use case based on the optional attribute. An example use case is pushing a QoS update to SMF 606 over an N7 interface based on the existing mechanism.

Figure 9:
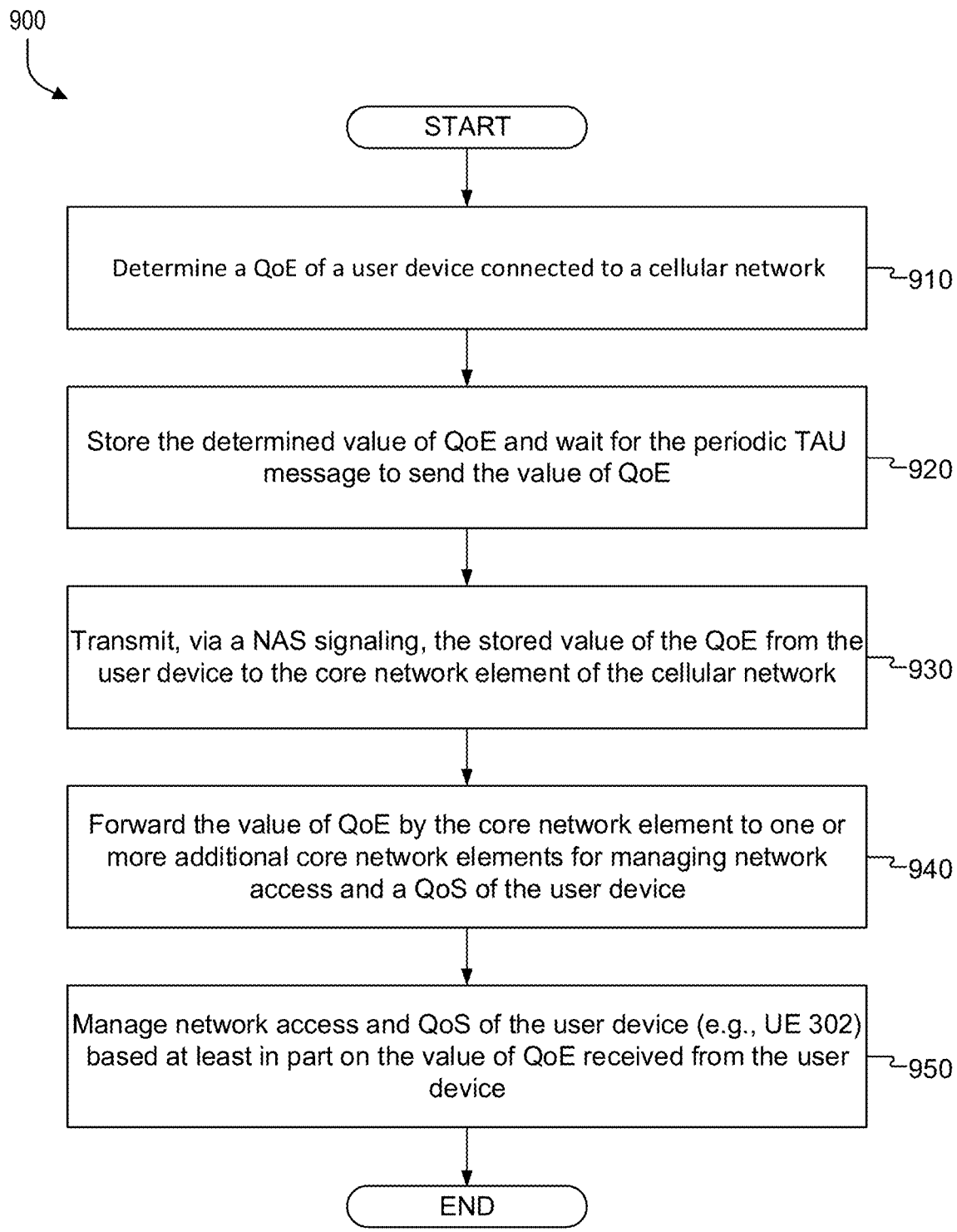
FIG. 9 illustrates a flowchart for a method of reporting QoE of a UE over NAS signaling, according to some aspects of the present disclosure.

FIG. 9 illustrates an example method 900 of reporting QoE of a UE over NAS signaling, according to some aspects of the present disclosure. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

While method 900 is described with reference to enhanced QoE reporting system 300 in FIG. 3, enhanced QoE reporting systems 500, 600, and 800 as illustrated in FIGS. 5, 6, and 8 can also implement the process of FIG. 9.

At step 910, method 900 includes determining a QoE of a user device connected to a cellular network. For example, enhanced QoE reporting system 300 as illustrated in FIG. 3 can determine a QoE of UE 302 connected to a cellular network. More specifically, UE 302 may perform a periodic health check of UE 302 to determine the QoE at UE 302 and determine a value for the QoE. This may be performed according to any known or to be developed method.

At step 920, method 900 includes storing the determined value of QoE and wait for the periodic TAU message to send the value of QoE with, to a core network element.

At step 930, method 900 includes transmitting, via a NAS signaling (e.g., as an optional attribute within a periodic TAU procedure (during idle), as described above with reference to step 415 (for LTE) and step 715 (for 5G)), the stored value of the QoE from the user device to the core network element of the cellular network. The core network element utilizes the QoE value to manage network access and a QoS of the user device based on the QoE value to one or more other core network elements of the cellular network.

For example, UE 302 can transmit, via a NAS signaling, a value of the QoE of UE 302 to a core network element (e.g., MME 304 as illustrated in FIGS. 2-4 or AMF 504 as illustrated in FIGS. 5-7). Further, the core network element (e.g., MME 304 as illustrated in FIGS. 2-4 or AMF 504 as illustrated in FIGS. 5-7) can utilize the QoE value to manage network access and a QoS of UE 302 based on the QoE value to one or more other core network elements of the cellular network (e.g., SPGW 306 as illustrated FIGS. 2 and 3, SCEF 402 as illustrated in FIG. 4, SMF 506 as illustrated in FIGS. 5 and 6, or PCF 508 as illustrated in FIG. 7).

According to some examples, the core network element is a Mobility Management Entity (MME) of the cellular network when the cellular network is a 4G network. For example, when the cellular network is a 4G network (i.e., LTE), the core network element can be MME 304 as illustrated in FIGS. 2-4.

At step 940, the method 900 includes forwarding the value of QoE by the core network element to one or more additional core network elements for managing network access and a QoS of UE 302. In example of an LTE system, MME 304 as illustrated in FIGS. 3 and 4 can forward, via MBR, the QoE value to SPGW 306, which then forwards the QoE value to PCRF 308, OCS 310, AAA 312, and CGW 314.

In some instances, the MME forwards the value of the QoE to a SCEF, which forwards the value of the QoE to an AF, which forwards the value of the QoE to a PCRF of the network. For example, MME 304 as illustrated in FIG. 5 can forward the QoE value to SCEF 502, which then forwards the QoE value to AF 504, which forwards the QoE value to PCRF 308 of a 4G network (i.e., LTE network).

According to some examples, the core network element is an element implementing an AMF when the cellular network is a 5G network. For example, when the cellular network is a 5G network, the core network element can be an element implementing AMF 604 as illustrated in FIGS. 6-8.

In some instances, the AMF forwards, via a session management context update, the value of the QoE to an SMF, which forwards the value of the QoE to a PCF and a CF of the network. For example, AMF 604 as illustrated in FIGS. 6 and 7 can forward, via a session management context update, the QoE value to SMF 606 in a 5G network.

In some examples, the AMF forwards the value of the QoE to an SMF and a PCF. For example, AMF 604 as illustrated in FIGS. 6-8 can forward the QoE value to SMF 606 and PCF 608.

At step 950, method 900 includes managing network access and QoS of the user device (e.g., UE 302) based at least in part on the value of QoE received from the user device. This managing of network access and QoS can include any number of known or to be developed process. For example, more network bandwidth may be dedicated to deliver network traffic to and from UE 302 to adhere to the QoS to which the UE has subscribed, charging for UE 302's usage based on the QoE, etc.

Example use cases of the present disclosure can range from per-UE cases to multiple UEs cases. One of the use cases can include charging based on a QoE value. For example, if a subscriber (e.g., UE) experiences a low QoE value (e.g., less than a configurable threshold determined based on experiments and/or empirical studies), a network service provider can charge a lower price compared to when the QoE value is high (e.g., equal to or greater than a configurable threshold determined based on experiments and/or empirical studies).

Another use case can include a QoS management based on a QoE value. In the currently existing approach, a high QoE or a better QoE is not guaranteed when a high QoS to a UE is allocated. In the proposed solution according to some examples of the present disclosure, if a QoE value is low, for a UE located further from a radio network, a network can decrease the QoS so that the network bandwidth can be allocated to other subscribers. Also, for a premium UE in a congested network, the network can also decrease the QoS of other UEs so that the QoE value of the premium UE can be improved.

Further, if a user device is a machine, the present disclosure can enable a Machine-to-Machine (M2M) provider to analyze the QoE of its solution.

Also, an example use case can include a user plane selection based on a QoE value. For example, in a 4G network, a network service provider can use a QoE value of a specific location to properly plan for SGW mapping on a specific Tracking Area Code (TAC) location. Also, in a 5G network, a 5G core solution can implement an algorithm on an NRF to perform UPF selection based on the QoE value.

Figure 10:
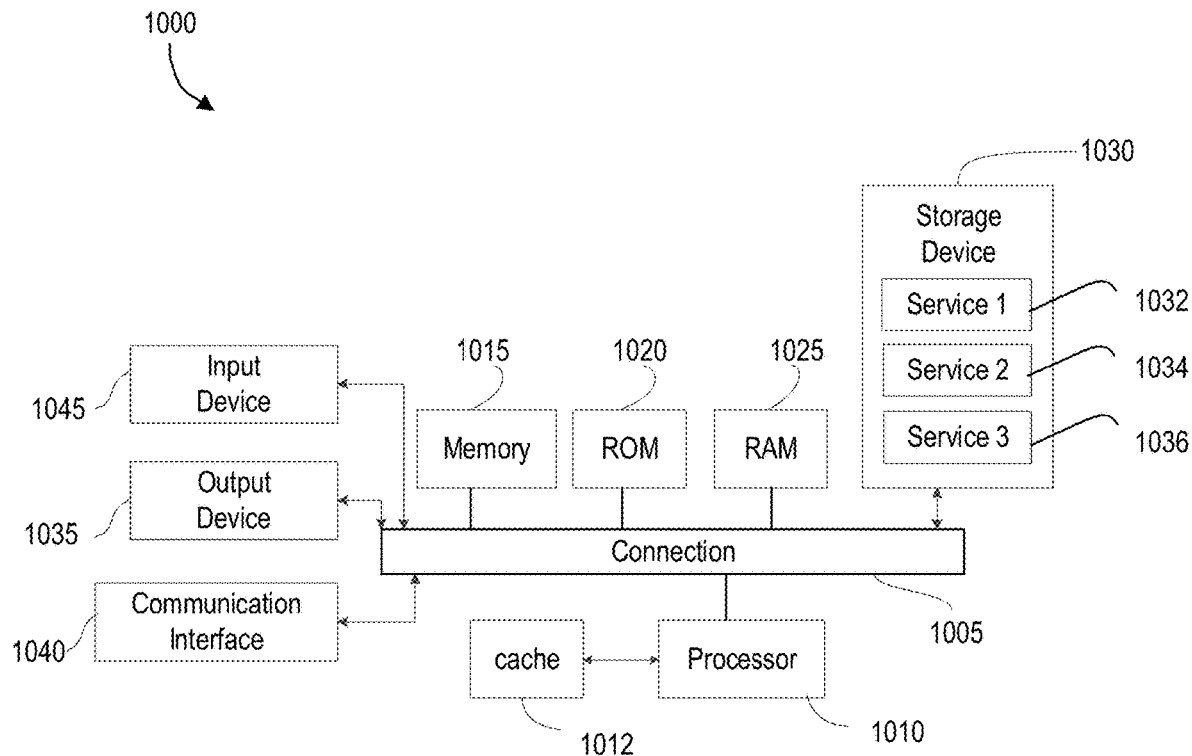
FIG. 10 illustrates an example network device, according to some aspects of the present disclosure.
Figure 11:
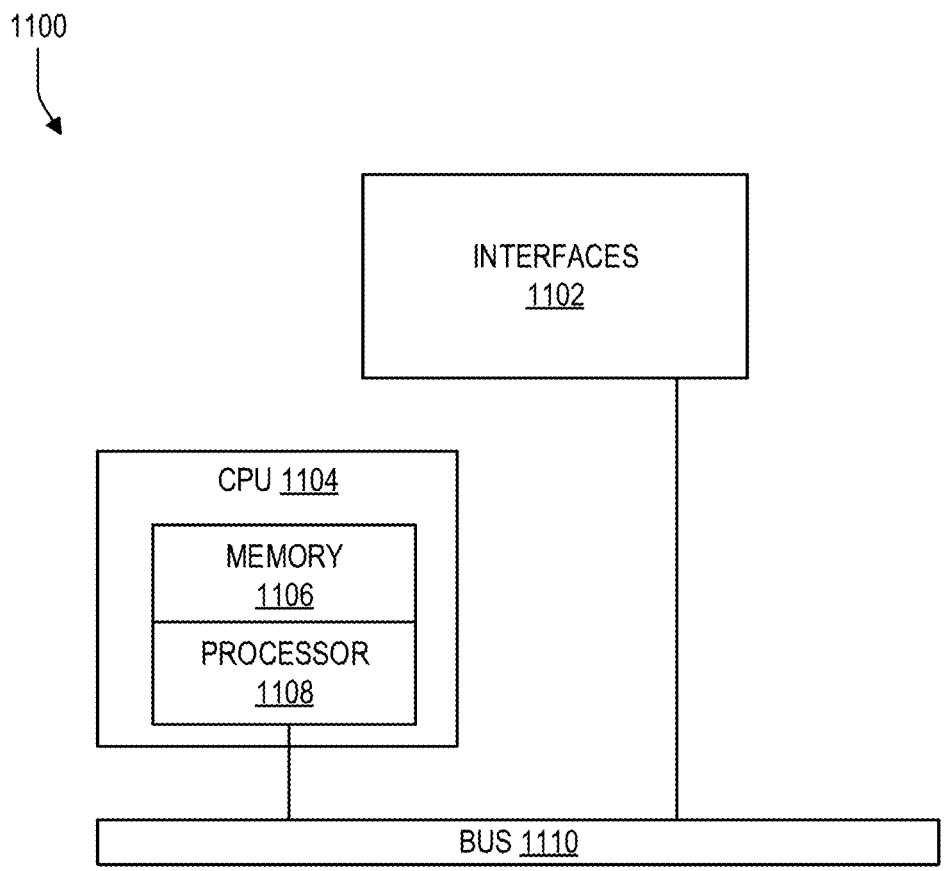
FIG. 11 shows an example computing system, which can be for example any computing device that can implement components of the system.

Following disclosure with respect to FIGS. 10 and 11 illustrates example network devices and computing devices, such as switches, routers, load balancers, client devices, and so forth. Such example network and computing devices may be used to implement various components described above with reference to FIGS. 1-9.

FIG. 10 illustrates an example computing system 1000 including components in electrical communication with each other using a connection 1005 upon which one or more aspects of the present disclosure can be implemented. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

FIG. 11 illustrates an example network device 1100 suitable for performing switching, routing, load balancing, and other networking operations, according to some aspects of the present disclosure. Network device 1100 includes a central processing unit (CPU) 1104, interfaces 1102, and a bus 1110 (e.g., a PCI bus). When acting under the control of appropriate software or firmware, the CPU 1104 is responsible for executing packet management, error detection, and/or routing functions. The CPU 1104 preferably accomplishes all these functions under the control of software including an operating system and any appropriate applications software. CPU 1104 may include one or more processors 1108, such as a processor from the INTEL X86 family of microprocessors. In some cases, processor 1108 can be specially designed hardware for controlling the operations of network device 1100. In some cases, a memory 1106 (e.g., non-volatile RAM, ROM, etc.) also forms part of CPU 1104. However, there are many different ways in which memory could be coupled to the system.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 11 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1100.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 1100 can also include an application-specific integrated circuit (ASIC), which can be configured to perform routing and/or switching operations. The ASIC can communicate with other components in the network device 1100 via the bus 1110, to exchange data and signals and coordinate various types of operations by the network device 1100, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   determining, at a user device, a quality of experience (QoE) of user device connected to a cellular network; and
   transmitting, via a non-access stratum (NAS) signaling, a value of the QoE from the user device to a core network element of the cellular network, wherein the core network element utilizes the QoE value and a quality of service (QOS) of the user device to manage access of the user device to one or more additional core network elements.

2. The method of claim 1, further comprising:
storing the value of the QoE at the user device to be transmitted to the core network element within an update message sent from the user device to the core network element.

3. The method of claim 1, wherein the value of the QoE is transmitted in real-time or periodically.

4. The method of claim 1, wherein the core network element is a Mobility Management Entity (MME) of the cellular network when the cellular network is a 4G network.

5. The method of claim 4, wherein the MME forwards, via a modify bearer request, the value of the QoE to (1) a serving gateway (SGW) and a packet data network gateway (PGW) of the cellular network or (2) an Application Function (AF) of the cellular network for managing the network access of the user device.

6. The method of claim 1, wherein the core network element is an element implementing an Access and Mobility Management Function (AMF) when the cellular network is a 5G network.

7. The method of claim 6, wherein the AMF forwards, via a session management context update, the value of the QoE to a Session Management Function (SMF) of the cellular network for managing the network access of the user device.

8. A device comprising:
one or more memories having computer-readable instructions; and
one or more processors configured to execute the computer-readable instructions to:
determine, at the device, a quality of experience (QoE) of device connected to a cellular network; and
transmit, via a non-access stratum (NAS) signaling, a value of the QoE from the device to a core network element of the cellular network, wherein the core network element utilizes the QoE value and a quality of service (QOS) of the user device to manage access of the user device to one or more additional core network elements.

9. The device of claim 8, wherein the one or more processors are configured to execute the computer-readable instructions to store the value of the QoE at the device to be transmitted to the core network element within an update message sent from the device to the core network element.

10. The device of claim 8, wherein the value of the QoE is transmitted in real-time or periodically.

11. The device of claim 8, wherein the core network element is a Mobility Management Entity (MME) of the cellular network when the cellular network is a 4G network.

12. The device of claim 11, wherein the MME is configured to forward, via a modify bearer request, the value of the QoE to (1) a serving gateway (SGW) and a packet data network gateway (PGW) of the cellular network or (2) an Application Function (AF) of the cellular network for managing the network access of the device.

13. The device of claim 8, wherein the core network element is an element implementing an Access and Mobility Management Function (AMF) when the cellular network is a 5G network.

14. The device of claim 13, wherein the AMF is configured to forward, via a session management context update, the value of the QoE to a Session Management Function (SMF) of the cellular network for managing the network access of the device.

15. One or more non-transitory computer-readable media comprising computer-readable instructions, which when executed by one or more processors at a user device, causes the user device to:
determine, at the user device, a quality of experience (QoE) of user device connected to a cellular network; and
transmit, via a non-access stratum (NAS) signaling, a value of the QoE from the user device to a core network element of the cellular network, wherein the core network element utilizes the QoE value and a quality of service (QOS) of the user device to manage access of the user device to one or more additional core network elements.

16. The one or more non-transitory computer-readable media of claim 15, wherein the value of the QoE is transmitted in real-time or periodically.

17. The one or more non-transitory computer-readable media of claim 15, wherein the core network element is a Mobility Management Entity (MME) of the cellular network when the cellular network is a 4G network.

18. The one or more non-transitory computer-readable media of claim 17, wherein the MME is configured to forward, via a modify bearer request, the value of the QoE to (1) a serving gateway (SGW) and a packet data network gateway (PGW) of the cellular network or (2) an Application Function (AF) of the cellular network for managing the network access of the user device.

19. The one or more non-transitory computer-readable media of claim 15, wherein the core network element is an element implementing an Access and Mobility Management Function (AMF) when the cellular network is a 5G network.

20. The one or more non-transitory computer-readable media of claim 19, wherein the AMF is configured to forward, via a session management context update, the value of the QoE to a Session Management Function (SMF) of the cellular network for managing the network access of the user device.

* * * * *